Nov. 24, 1936.  H. G. KELLOGG  2,061,970
FASTENER FOR TRIM STRIPS
Filed May 15, 1936
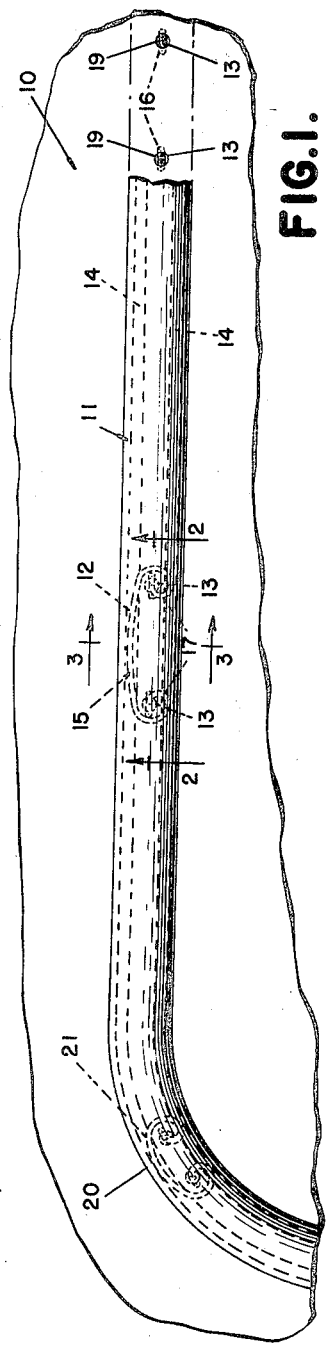
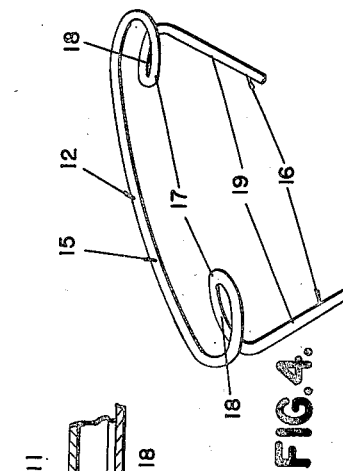
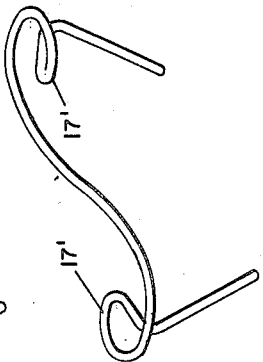
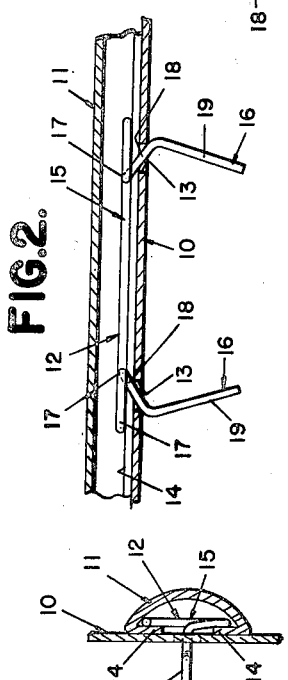
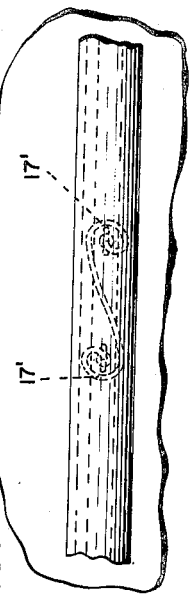
INVENTOR
HOMER G. KELLOGG
BY
ATTORNEYS Patented Nov. 24, 1936

2,061,970

UNITED STATES PATENT OFFICE 2,061,970

FASTENER FOR TRIM STRIPS

Homer G. Kellogg, Detroit, Mich., assignor to Motor Products Corporation, Detroit, Mich., a corporation of New York Application May 15, 1936, Serial No. 80,002

8 Claims. (Cl. 189—88)

This invention relates generally to fasteners and refers more particularly to snap fasteners of the type employed to secure sheet metal trim strips, moldings and the like to a supporting structure.

One of the principal objects of this invention resides in the provision of a snap fastener formed by bending a strip of spring wire to provide a head portion adapted to be slidably received in the channel of the trim strip and to provide laterally extending leg portions at opposite ends of the head adapted to be inserted through openings spaced from each other longitudinally of the trim strip.

Another advantageous feature of this invention consists in the provision of a snap fastener of the character set forth in the preceding paragraph wherein the head portion is formed of an elongated strip of wire looped at opposite ends to form the laterally extending legs aforesaid, and wherein the legs are shaped to contract and expand upon insertion in the openings in the support so as to cooperate with the looped ends of the head to secure the trim strip under tension to the support.

The foregoing, as well as other objects, will be made more apparent as this description proceeds especially when considered in connection with the accompanying drawing wherein.

Figure 1 is a fragmentary elevational view of a supporting structure such as an automobile body panel having a trim strip attached thereto by my improved snap fastener;

Figure 2 is an enlarged fragmentary sectional view taken substantially on the plane indicated by the line 2—2 of Figure 1;

Figure 3 is a cross sectional view taken substantially on the plane indicated by the line 3—3 of Figure 1;

Figure 4 is a perspective view of the fastener element;

Figure 5 is a view similar to Figure 1 showing a slightly modified form of fastener element, and Figure 6 is a perspective view of the fastener element shown in Figure 5.

Although the snap fastener forming the subject of this invention is capable of numerous and diversified uses, nevertheless, for the purpose of illustration, I have shown the same as employed to secure a trim strip to an automobile body panel. In Figure 1, the body panel is fragmentarily illustrated by the reference character 10 and the trim strip or molding 11 is shown as secured to the panel by a plurality of snap fastener stud elements 12 having portions engageable in apertures 13 formed in the panel or supporting structure 10 in spaced relation to each other longitudinally of the trim strip.

The trim strip or molding 11 is of the well known sheet metal construction, being channel shaped in cross section and having inwardly extending foot flanges 14 at the free edges of the side walls of the channel. Upon reference to Figure 3, it will be noted that the foot flanges 14 engage the supporting structure at opposite sides of the openings 13 and are spaced from each other to permit the portions aforesaid of the fastener elements 12 to be extended into the openings 13.

The snap fastener 12 is formed of a single strip of resilient material, such as spring wire, and comprises a head 15 terminating at opposite ends in laterally extending legs 16. The head 15 is formed by a single strand of wire elongated in the direction of the trim strip, and the legs 16 are integrally connected to opposite ends of the head by looped portions 17 forming parts of the head 15. As shown in Figure 3, the head 15 is slidably received in the channel of the trim strip and the width of the loops 17 is greater than the space between the free edges of the foot flanges 14 in order to maintain the fastener elements in assembled relation with the trim strips. Also the strand wire connecting the loops is bowed to such an extent that the intermediate portion thereof engages one of the foot flanges 14 at a point between the loops.

Referring now to Figure 4 of the drawing, it will be noted that the legs 16 of the fastener element are bowed intermediate their ends to form diverging portions 18 extending from the extremities of the loops 17 and to form converging portions 19 having the ends spaced from each other a distance approximating the center line distance between adjacent openings 13 through the supporting structure. The construction is such that as the spaced converging portions of the legs of the fastener are inserted in the openings 13, the legs are forced toward each other until the outwardly bowed portions pass through the apertures 13 whereupon the legs again spring apart to resiliently retain the fastener in engagement with the edges of the apertures 13. It will be noted from Figure 2 that as the legs attempt to return to their free positions, the diverging portions 18 thereof resiliently urge the loops 17 and the bowed connecting portion of the head into engagement with the foot flanges 14 of the trim strip and in so doing, secure the latter under tension to the supporting structure. It necessarily follows from the above that the longer the fastener element, the greater the area of the trim strip that is clamped to the supporting structure by a single fastener, and the latter may be as long as practical in securing a straight strip of molding in place. However, if it is desired to clamp a relatively short radius of the strip in place as indicated by the character 20 in Figure 1, a shorter fastener element 21 is required. With the exception of the length, the fastener element 21 is of the same construction as the fastener 12 and operates in exactly the same manner as the latter.

The fastener element shown in Figures 5 and 6 differs from the element 12 in that the portion of the head connecting the end loops 17' is S-shaped so as to extend transversely of the channel. With this exception, the fastener element in the latter figures is identical in construction and operates in the same manner as the fastener element 12 hereinbefore described.

Thus from the foregoing, it will be noted that I have provided a relatively simple, inexpensive snap fastener element capable of effectively clamping a relatively long section of the molding under tension to the supporting structure and thereby rendering it possible to eliminate any possibility of the trim strip rattling due to a loose fit between the strip and fastener element. It will also be observed that with my improved snap fastener element, trim strips may be readily attached to a supporting structure, not only because of the snap feature but also because of the facility with which the fastener elements may be properly spaced for registration with the openings 13.

What I claim as my invention is:

1. The combination with a channel-shaped strip and a support therefor, of a snap fastener for detachably securing the channel-shaped strip to the support, said fastener comprising a part having a head portion elongated in the direction of length of the strip and slidably engageable in the channel of the latter, and outwardly bowed leg portions extending laterally from the head adjacent opposite ends thereof and insertable within spaced openings in the support.

2. The combination with a channel-shaped strip and a support therefor, of a snap fastener for detachably securing the channel-shaped strip to the support, said fastener element having outwardly bowed resilient legs spaced from each other in the direction of length of the strip and insertable within spaced openings in the support, and a head on the fastener element integrally connecting the legs and slidably engageable in the channel of the strip.

3. The combination with a channel-shaped strip and a support therefor, of a snap fastener for detachably securing the channel-shaped strip to the support, said fastener comprising a part having a head portion elongated in the direction of length of the strip and slidably engageable in the channel of the latter, said head having looped portions at opposite ends terminating in outwardly bowed legs insertable within spaced openings in the support.

4. The combination with a channel-shaped strip and a support therefor, of a snap fastener for detachably securing the channel-shaped strip to the support, said fastener element having outwardly bowed resilient legs spaced from each other in the direction of length of the strip and insertable within spaced openings in the support, and a head on the fastener element slidably engageable in the channel and integrally connecting the legs through loops disposed in a plane substantially parallel to the plane of the support.

5. The combination with a channel-shaped strip and a support therefor, of a snap fastener for detachably securing the channel-shaped strip to the support, said fastener element having outwardly bowed resilient legs spaced from each other in the direction of length of the strip in a substantially common plane perpendicular to the plane of the support and insertable within openings in the support, and a head portion slidably engageable in the channel of the strip, said head portion integrally connecting the legs aforesaid and disposed in a plane substantially parallel to the plane of the support.

6. The combination with a channel-shaped strip and a support therefor, of a snap fastener for detachably securing the channel-shaped strip to the support, said fastener element having outwardly bowed resilient legs spaced from each other in the direction of length of the strip in a substantially common plane perpendicular to the plane of the support and insertable within openings in the support, and a head portion bowed in a plane substantially perpendicular to the plane of the legs and slidably engageable in the channel of the strip, said head integrally connecting the legs through loops disposed substantially in the plane of the bowed portion of the head.

7. The combination with a channel-shaped strip having inturned flanges at the free edges spaced from each other and a support engaged by the flanges, of a snap fastener for detachably securing the channel-shaped strip to the support, said fastener element comprising a part having a head portion elongated in the direction of length of the strip and slidably engageable in the channel of the strip, said head having portions overlapping the inner surfaces of the flanges aforesaid on the strip and having outwardly bowed legs at opposite ends insertable into spaced openings in the support.

8. The combination with a channel-shaped strip having inturned flanges at the free edges spaced from each other and a support engaged by the flanges, of a snap fastener for detachably securing the channel-shaped strip to the support, said fastener element comprising a part having a head portion elongated in the direction of length of the strip and slidably engageable in the channel of the strip, said head having looped portions at opposite ends overlapping the inner surfaces of the flanges aforesaid on the strip and having outwardly bowed legs extending laterally from the loops for insertion into spaced openings in the support.

HOMER G. KELLOGG.